United States Patent [19]
Morlion et al.

[11] Patent Number: 5,651,084
[45] Date of Patent: Jul. 22, 1997

[54] ALIGNMENT PIECE FOR A CONNECTOR FOR OPTICAL CONDUCTORS

[75] Inventors: Danny Morlion, St. Amandsberg; Luc Jonckheere, Dilbeek; Jan Peter Karel Van Koetsem, Zwijndrecht, all of Belgium

[73] Assignee: Framatome Connectors International, France

[21] Appl. No.: 524,227

[22] Filed: Sep. 6, 1995

[30]     Foreign Application Priority Data

Sep. 8, 1994 [NL] Netherlands ............................ 9401457

[51] Int. Cl.$^6$ ...................................................... G02B 6/36
[52] U.S. Cl. .............................. 385/137; 385/71; 385/52; 385/65; 385/83
[58] Field of Search ............................... 385/137, 98, 71, 385/52, 65, 83

[56]             References Cited

U.S. PATENT DOCUMENTS

| 4,028,162 | 6/1977 | Cherin et al. | 385/98 |
|---|---|---|---|
| 4,045,121 | 8/1977 | Clark | 350/96 |
| 4,181,400 | 1/1980 | Malsot et al. | 385/83 |
| 5,155,787 | 10/1992 | Carpenter et al. | 385/98 |
| 5,199,966 | 4/1993 | Harvey et al. | 385/98 |
| 5,440,657 | 8/1995 | Essert | 385/71 |

FOREIGN PATENT DOCUMENTS

| 2476856 | 8/1981 | France . |
|---|---|---|
| 2626083 | 7/1989 | France . |

*Primary Examiner*—Rodney B. Bovernick
*Assistant Examiner*—Yisun Song
*Attorney, Agent, or Firm*—Perman & Green

[57]                ABSTRACT

An alignment piece (1, 13) for a connector for optical conductors (10) comprises a support plate (2, 14), a guiding plate (3, 15) manufactured with very high accuracy and one or more alignment channels (4) for the conductors. At least the ends (11) of the alignment channels are formed in the guiding plate. The guiding plate (3, 15) is further provided with an inclining guiding plate part (5) in which the alignment channels (4) are formed. The support plate (2, 14) has a recess (6) in which the free end of the inclining guiding plate part (5) is received. The support plate includes a guiding surface (7) for the conductors (10), the guiding surface with its side directed towards the inclining guiding plate part lying above the free end of the guiding plate part.

7 Claims, 4 Drawing Sheets

ALIGNMENT PIECE FOR A CONNECTOR FOR OPTICAL CONDUCTORS

BACKGROUND OF THE INVENTION

The invention relates to an alignment piece for a connector for optical conductors, comprising a support plate, a guiding plate manufactured with very high accuracy and one or more alignment channels for the conductors, wherein at least the ends of the alignment channels are formed in the guiding plate.

Such an alignment piece is described in the earlier international patent application PCT/EP95/02403 of the same applicant. In an embodiment of this alignment piece wherein the guiding plate is mounted as separate component on the support plate, a problem may occur during introducing the conductors in that the ends of the conductors are stopped by an edge of the guiding plate.

The invention aims to provide an alignment piece of the above-mentioned type wherein this problem is overcome in an effective manner.

SUMMARY OF THE INVENTION

In the alignment piece according to the invention the guiding plate is provided with an inclining guiding plate part in which the alignment channels are formed, wherein the support plate has a recess in which the free end of the inclining guiding plate part is received and wherein the support plate includes a guiding surface for the conductors, said guiding surface with its side directed towards the inclining guiding plate part lying above the free end of the guiding plate part.

Thereby an alignment piece is obtained wherein a smooth introduction of the conductors is guaranteed.

Preferably the alignment channels in the inclining guiding plate part have an increasing width as seen from its free end, wherein the width at the side of the free end is smaller than the diameter of the conductors. Due to the gradually increasing width of the alignment channels the conductors are introduced in the ends of the alignment channels in the guiding plate without any problems.

BRIEF DESCRIPTION OF THE DRAWINGS

The invention will be further explained hereinafter by reference to the drawings in which some embodiments of the alignment piece according to the invention are shown.

DETAILED DESCRIPTION OF THE PREFERRED EMBODIMENTS

Figure 1:
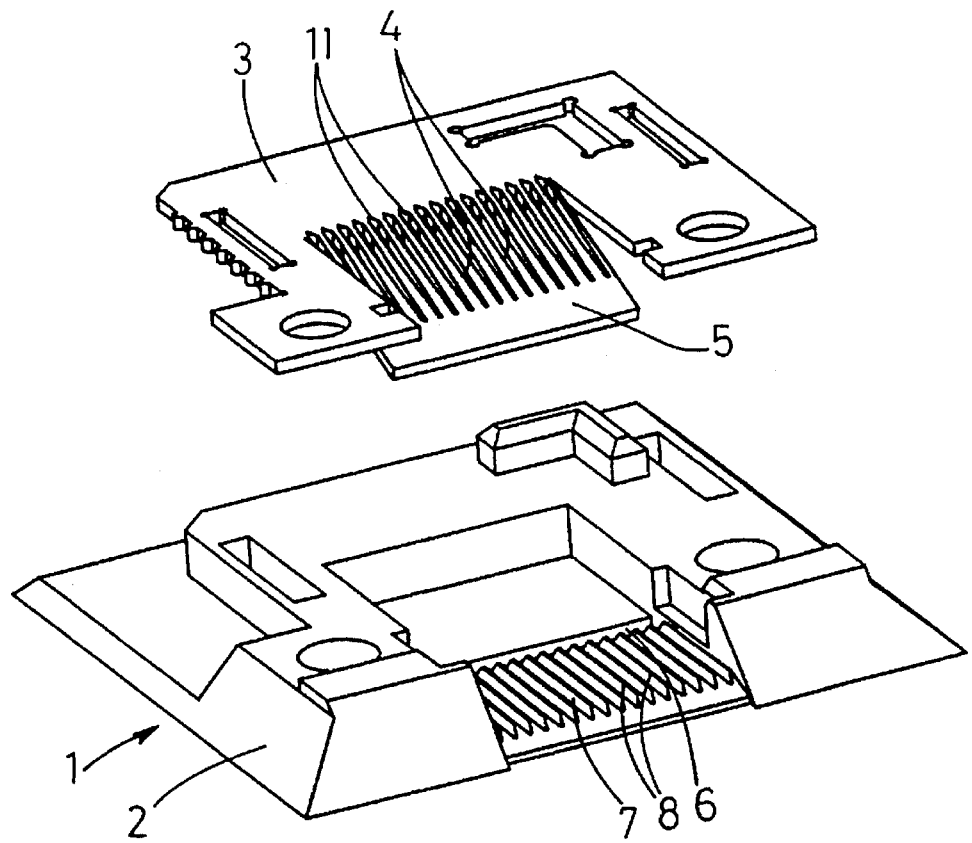
FIG. 1 shows a perspective view of a first embodiment of an alignment piece according to the invention intended for embedding in a printed circuit board, wherein the guiding plate is shown separate from the support plate.
Figure 2:
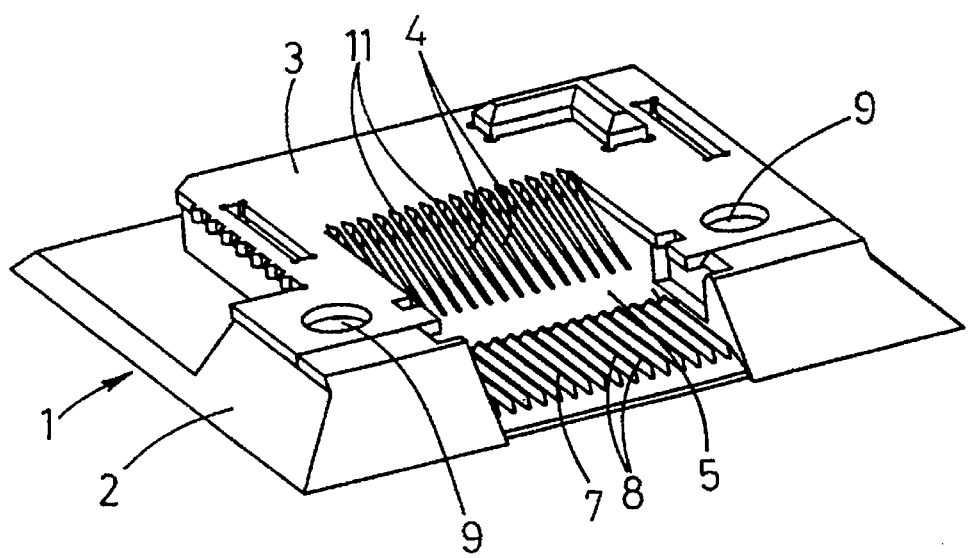
FIG. 2 shows the alignment piece of FIG. 1, wherein the guiding plate is attached to the support plate.

FIGS. 1 and 2 show a perspective view of an alignment piece 1 for a connector for optical conductors, said connector being assembled of a support plate 2 and a guiding plate 3. The support plate 2 is manufactured with usual techniques, for example of plastic material and the guiding plate 3 is manufactured with very high accuracy, for example of metal. A suitable technique for this purpose is the so-called LIGA-technique. For a further explanation of the construction of the alignment piece 1 reference is made to the international patent application PCT/EP95/02403 of the same applicant.

The alignment piece 1 comprises one or more alignment channels 4 for conductors not shown in FIGS. 1 and 2. The alignment channels 4 are formed in an inclined guiding plate part 5, the free end of which is received in a recess 6 in the support plate 2 (see FIGS. 6–8).

The support plate 2 has a guiding surface 7 for the conductors lying below the surface of the guiding plate 3, wherein in the embodiment shown pre-alignment channels 8 are formed in this guiding surface 7, which can be seen as part of the alignment channels 4.

Figure 6:
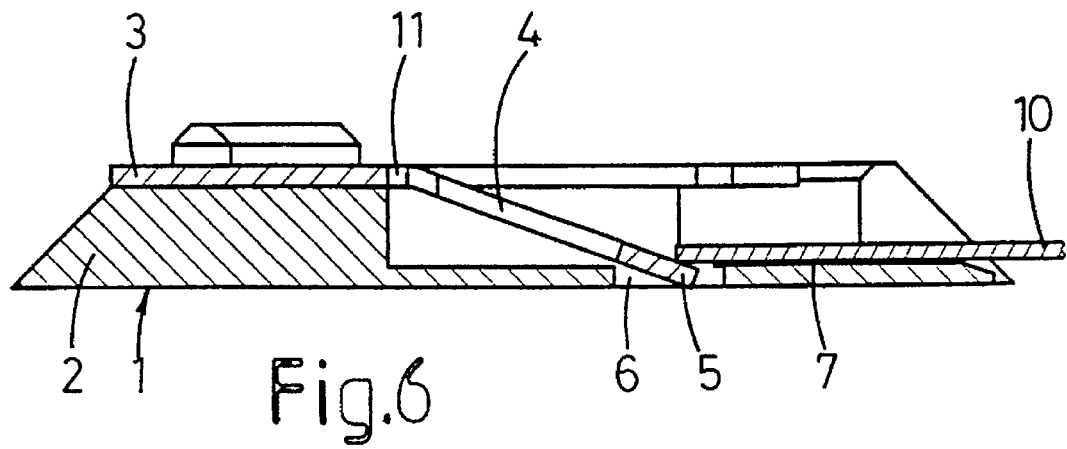
FIGS. 6–8 are schematical cross-sections of the alignment piece of FIG. 2, in which successive steps during the introduction of a conductor are shown.
Figure 7:
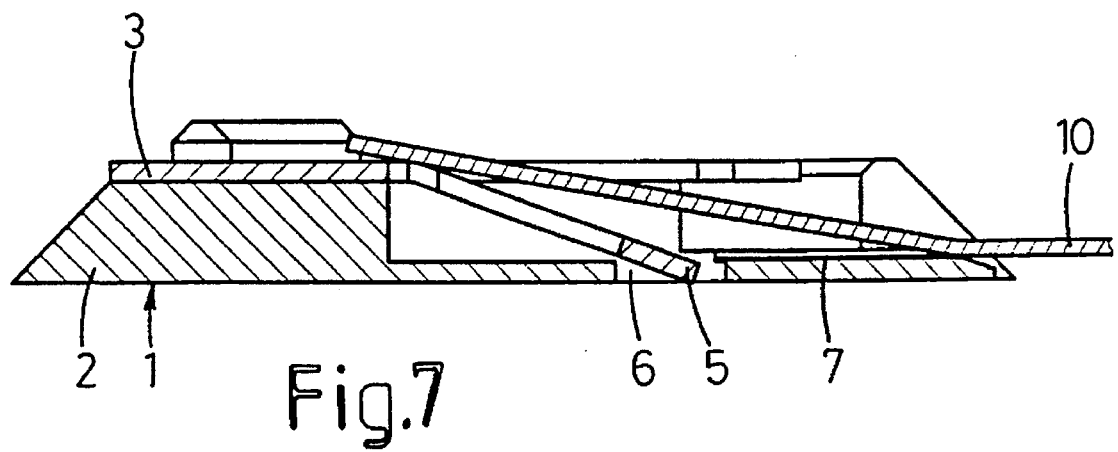
Figure 8:
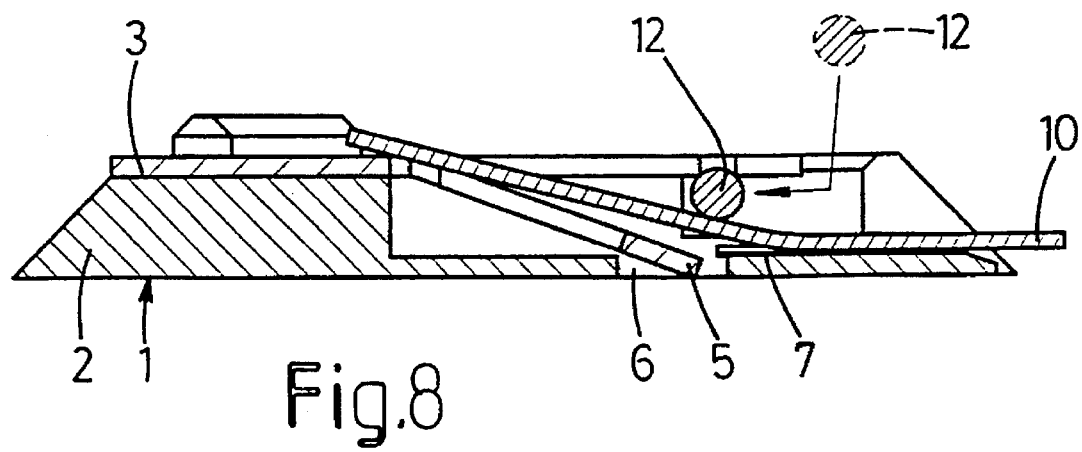

As shown in particular in the cross-sections of FIGS. 6–8, the guiding surface 7 is lying above the free end of the guiding plate part 5 at least with its side joining the inclined guiding plate part 5.

Figure 5:
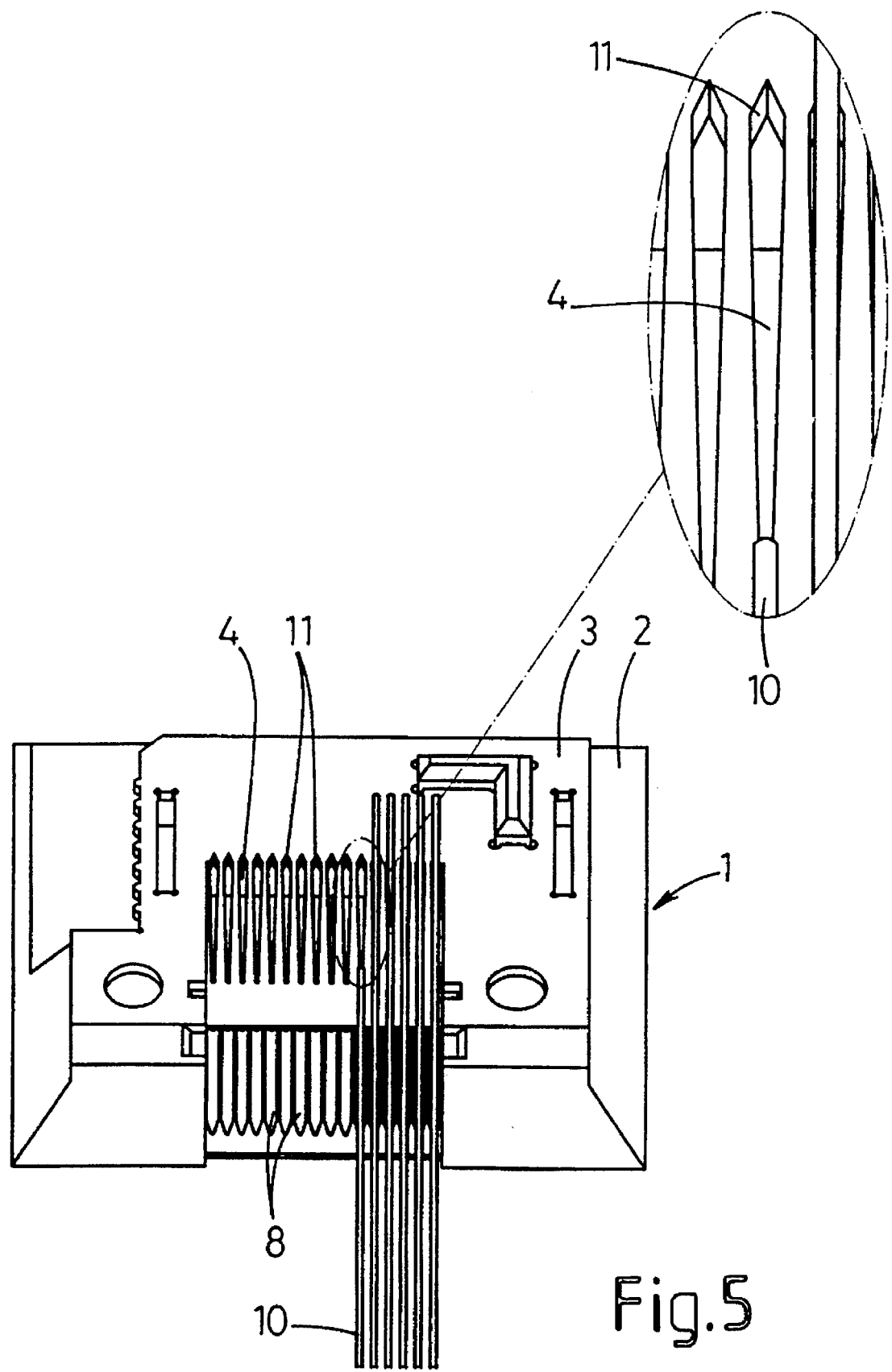
FIG. 5 is a top view of the alignment piece of FIG. 2, wherein a detail is shown at a larger scale.

As described in the earlier international patent application PCT/EP95/02403 the alignment piece 1 is placed on a wiring table not shown for providing the conductors. To this end the alignment piece is provided with positioning openings 9 cooperating with positioning pins of the wiring table. When a conductor 10 schematically shown in FIG. 6 is pushed into a pre-alignment channel 8, the end of the conductor 10 cannot be impeded during pushing in by an edge or the like of the guiding plate 3. The conductor 10 is aligned with the corresponding alignment channel 4 by the pre-alignment channel 8. The alignment channels 4 have a width increasing from the free end of the inclined guiding plate part 5, wherein the width at the side directed towards the free end is smaller than the width of the conductor 10 as shown in FIG. 5 in the detail at larger scale. The end 11 of each alignment channel 4 in the surface of the guiding plate 3 is formed as a V-shaped slot determining the location of the conductor 10 with very high accuracy.

FIG. 7 shows the situation in which the conductor 10 is fully pushed into the alignment piece 1. As schematically indicated in FIG. 8, a positioning element 12 made as a round bar is then mounted in the alignment piece 1, said positioning element 12 together with the end 11 of the alignment channel 4 determining the angle of inclination of the conductor 10 in the alignment piece. For a further explanation reference is made to a patent application of the same date of the same applicant. Of course the positioning element 12 is not mounted until all conductors 10 are provided in the alignment piece 1.

Figure 3:
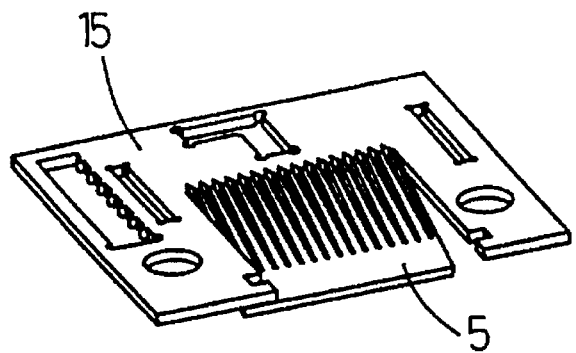
FIG. 3 shows a second embodiment of an alignment piece according to the invention intended for a cable connector wherein the guiding plate is shown separate from the support plate.
Figure 3:
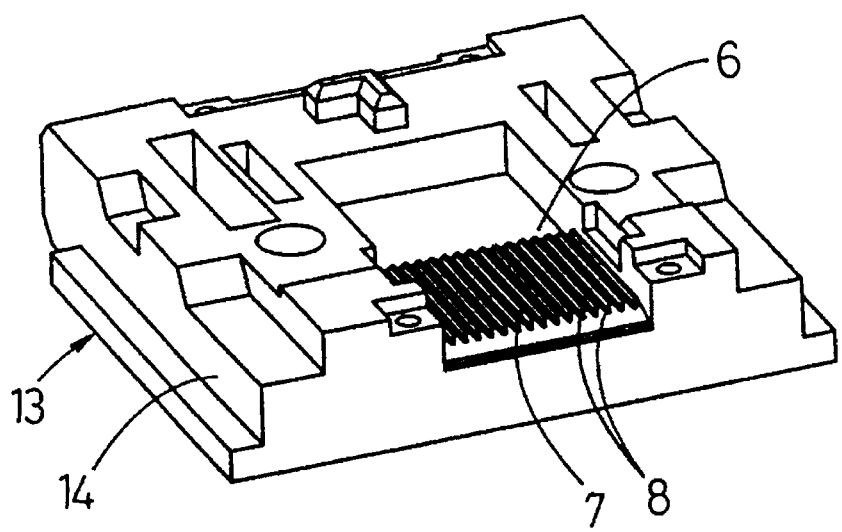
Figure 4:
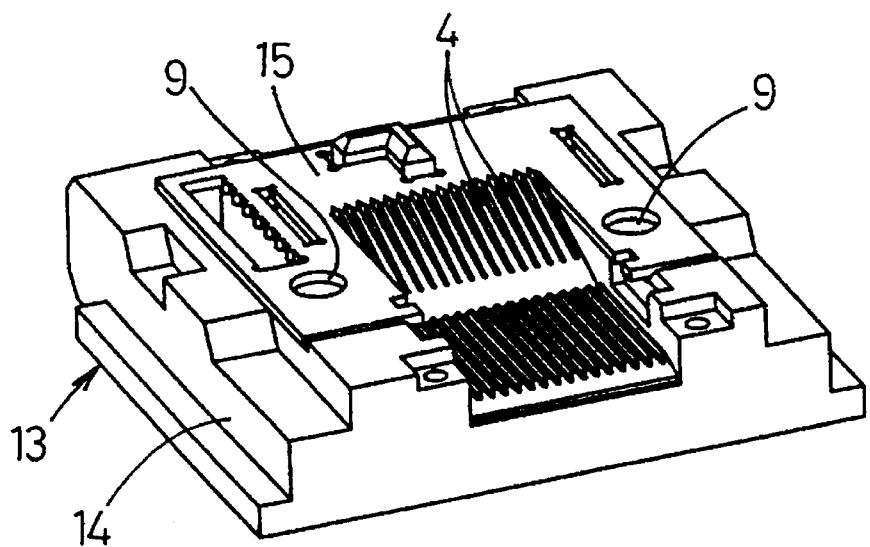
FIG. 4 shows the alignment piece of FIG. 3 wherein the guiding plate is attached to the support plate.

FIGS. 3 and 4 show an alignment piece 13 which in the same manner as alignment piece 1 is assembled of a support plate 14 and a guiding plate 15 mounted thereon. The guiding plate 15 is provided with an inclined guiding plate part 5 in the same manner as the guiding plate 3, the free end of the guiding plate part 5 being received in a recess 6 of the support plate 14. This support plate 14 has a guiding surface 7 with pre-alignment channels 8 in the same manner as the support plate 2.

In the described embodiments of the alignment piece according to the invention the alignment piece comprises a support plate and a guiding plate made as separate parts. However within the scope of the invention it is also possible to manufacture the alignment piece with support plate and guiding plate as a unit. When it is mentioned in the description and claims that the alignment piece is provided with a support plate and a guiding plate, these parts can therefore be made as a unit.

The invention is not restricted to the above-described embodiments which can be varied in a number of ways within the scope of the claims.

We claim:

1. Alignment piece for a connector for optical conductors, comprising a support plate with a top surface, a guiding plate manufactured with very high accuracy, said guiding plate being supported on the top surface of said support plate, and one or more alignment channels for the conductors, said alignment channels having ends formed in the guiding plate, wherein the guiding plate is provided with an inclining guiding plate part in which the alignment channels are formed, said inclining guiding plate part having a free end wherein the support plate has a recess in which said free end of the inclining guiding plate part is received and wherein the support plate includes a guiding surface for the conductors, said guiding surface having a side directed towards the inclining guiding plate part, said side of the guiding surface lying above the free end of the guiding plate part.

2. Alignment piece according to claim 1, wherein the inclining guiding plate part has a lower end and an upper end, the alignment channels in the inclining guiding plate part having an increasing width as seen from said lower end, wherein the width at the side of the lower end is smaller than the diameter of the conductors.

3. Alignment piece according to claim 1, wherein the guiding surface of the support plate is provided with pre-alignment channels corresponding with the alignment channels.

4. Alignment piece according to claim 1, wherein the support plate and the guiding plate are made as a unit.

5. Alignment piece for a first connector for a first group of optical conductors to be interconnected with a second group of optical conductors of a second connector, comprising a support plate with a top surface, a guiding plate manufactured with very high accuracy, said guiding plate being supported on the top surface of said support plate, and one or more alignment channels for the conductors, said alignment channels having ends formed in the guiding plate, wherein the guiding plate is provided with an inclining guiding plate part in which the alignment channels are formed, said inclining guiding plate part having a free end, wherein the support plate has a recess in which said free end of the inclining guiding plate part is received, and wherein the support plate includes a guiding surface for the conductors, said guiding surface having a side directed towards the inclining guiding plate part, said side of the guiding surface lying above the free end of the guiding plate part.

6. Alignment piece for a connector for optical conductors, comprising a support plate with a top surface, a guiding plate manufactured with very high accuracy, said guiding plate being supported on the top surface or said support plate, and one or more alignment channels for the conductors, said alignment channels having ends formed in the guiding plate, wherein the guiding plate is provided with an inclining guiding plate part in which the alignment channels are formed, said inclining guiding plate part having a free end wherein the support plate has a recess in which said free end of the inclining guiding plate part is received and wherein the support plate includes a guiding surface for the conductors, said guiding surface having a side directed towards the inclining guiding plate part, said side of the guiding surface lying above the free end of the guiding plate part, wherein the inclining guiding plate part has a lower end and an upper end, the alignment channel in the inclining guiding plate part having an increasing width as seen from said lower end, wherein the width at the side of the lower end is smaller than the diameter of the conductors.

7. Alignment piece for a first connector for a first group of optical conductors to be interconnected with a second group of optical conductors of a second connector, comprising a support plate with a top surface, a guiding plate manufactured with very high accuracy, said guiding plate being supported on the top surface of said support plate, and one or more alignment channels for the conductors, said alignment channels having ends formed in the guiding plate, wherein the guiding plate is provided with an inclining guiding plate part in which the alignment channels are formed, said inclining guiding plate part having a free end wherein the support plate has a recess in which said free end of the inclining guiding plate part is received and wherein the support plate includes a guiding surface for the conductors, said guiding surface having a side directed towards the inclining guiding plate part, said side of the guiding surface lying above the free end of the guiding plate part, wherein the inclining guiding plate part has a lower end and an upper end, the alignment channels in the inclining guiding plate part having an increasing width as seen from said lower end, wherein the width at the side of the lower end is smaller than the diameter of the conductors.

* * * * *